June 6, 1939.  F. C. WERNER  2,161,211
BAKING OVEN
Original Filed Oct. 18, 1937    2 Sheets—Sheet 1
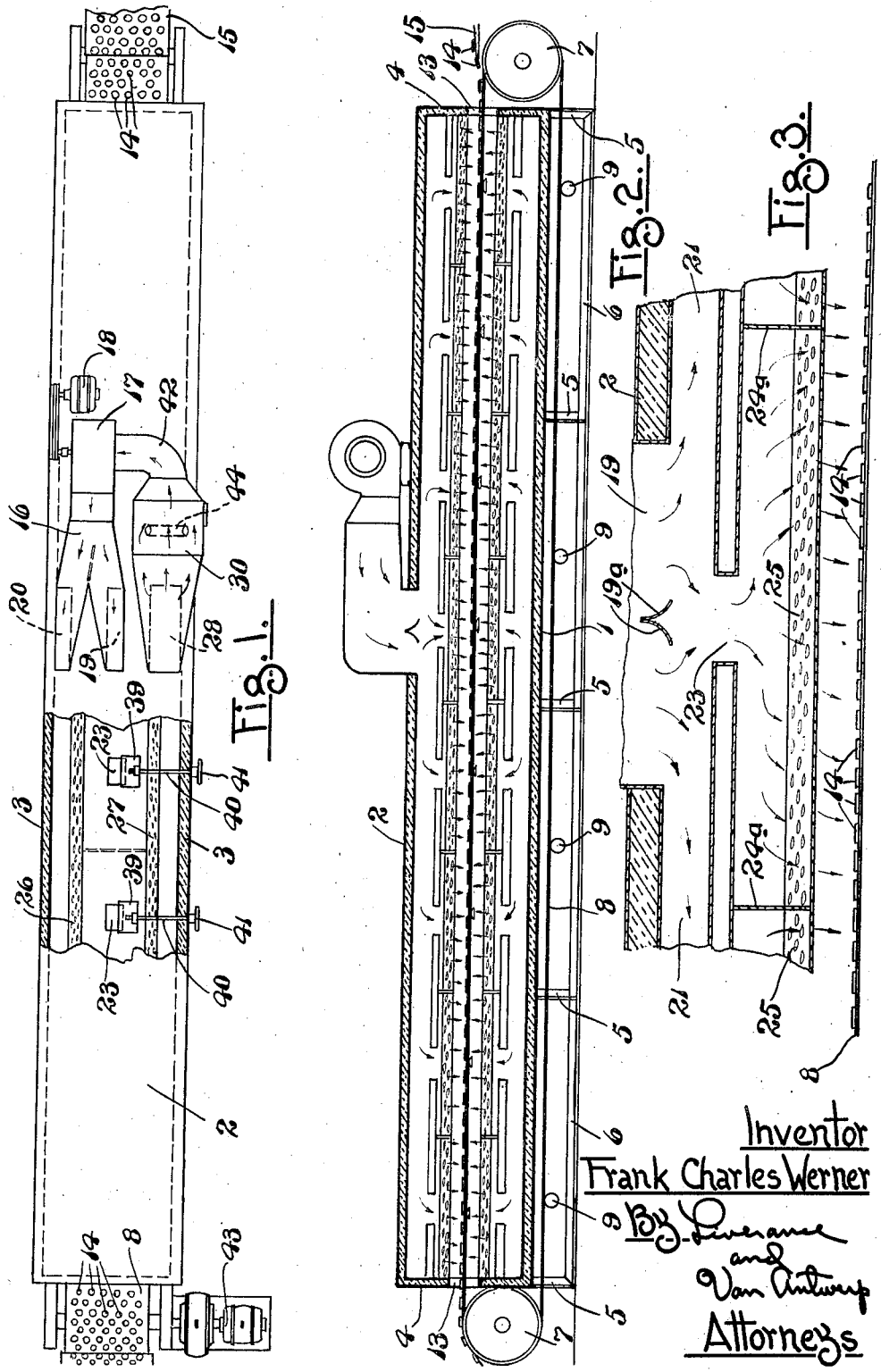
Inventor
Frank Charles Werner
By Liverance
and
Van Antwerp
Attorneys

Patented June 6, 1939

2,161,211

UNITED STATES PATENT OFFICE 2,161,211

BAKING OVEN

Frank Charles Werner, Grand Rapids, Mich.

Application October 18, 1937, Serial No. 169,609
Renewed March 24, 1939

14 Claims. (Cl. 107—57)

This invention relates to a baking oven and is concerned with an oven for the continuous baking of baked products, such as cookies or the like, which may be formed upon a suitable producing machine from dough and delivered to an endless carrier passing through the oven, the cookies being baked when delivered at the far end of the oven away from the cookie making machine. It is an object and purpose of the present invention to provide a very practical, efficient and high quantity production oven in which cookies or the like articles may be rapidly baked, and in which the heat is supplied by high temperature air which is forced into the oven and into all parts thereof adjacent the cookies both above and below, and in which the quantity of air applied to the cookies at different parts of the oven may be controlled and regulated to obtain uniformity and certainty in the baked product produced. The invention consists in many novel details of construction and arrangements and organization of parts for effectively attaining the objects stated, as well as many others not now enumerated but which will appear upon an understanding of the invention from the following description, taken in connection with the accompanying drawings, in which:

Fig. 1 is a plan view of the oven, parts thereof being broken away to show interior structure.

Fig. 2 is a longitudinal vertical section therethrough.

Fig. 3 is a fragmentary enlarged longitudinal vertical section at the central part of the oven.

Like reference characters refer to like parts in the different figures of the drawings.

Figure 4:
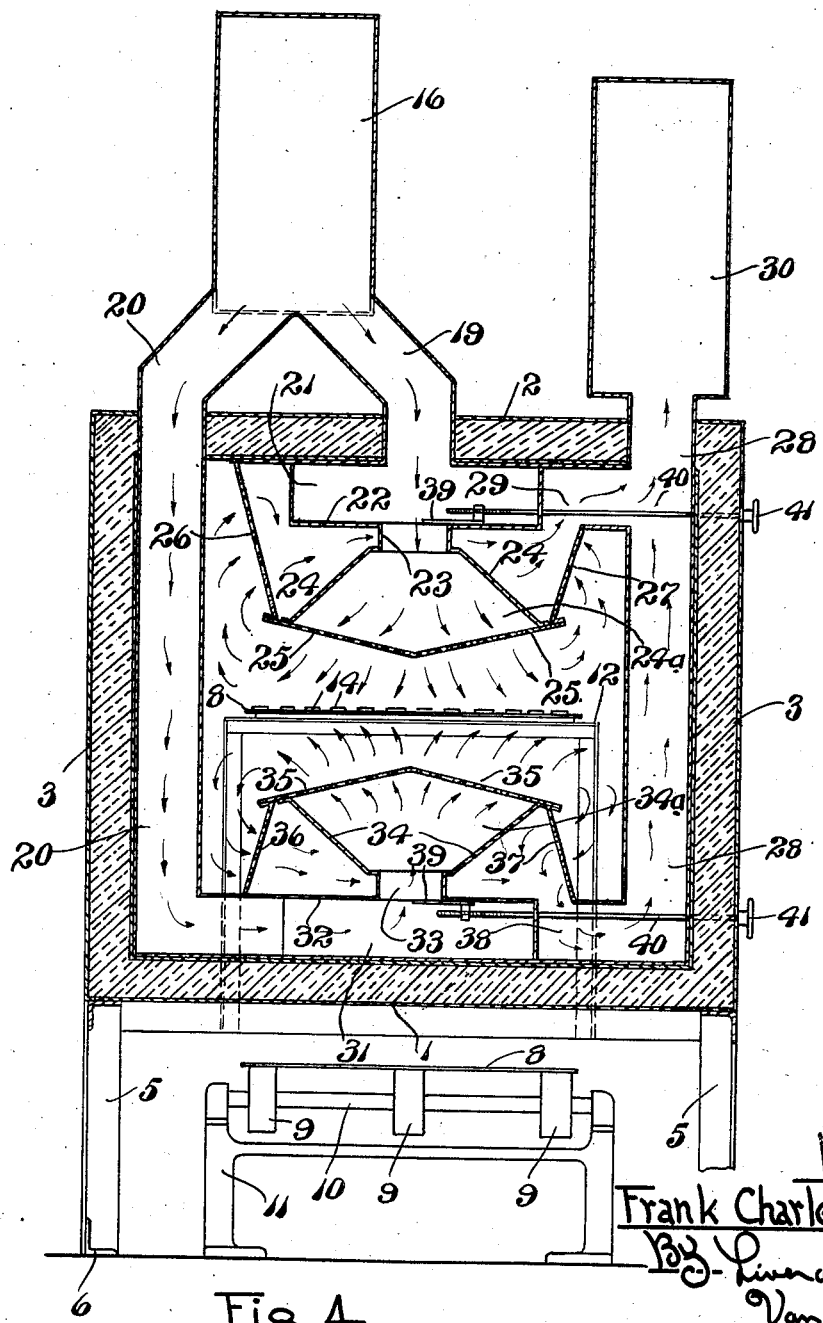
Fig. 4 is an enlarged transverse section substantially at the place where the air is forced into the oven and leaves therefrom and illustrating the air circulation within the oven.

In the construction, an elongated enclosure is provided having a horizontal bottom 1, horizontal top 2, vertical sides 3 and vertical ends 4. In practice the sides, top and bottom may be made of sheet metal with an inner lining spaced from the outer covering and the space between filled with heat insulating material. The oven enclosure is supported above the floor by posts 5, preferably connected at their lower ends with horizontal rails 6, similar rails extending lengthwise and at the lower side of the oven as shown.

At opposite ends of the oven rollers 7 on shafts are provided around which an endless belt 8 is carried, the lower run of which is supported at spaced apart intervals by carrying rollers 9 on shafts 10, the shafts in turn being carried by supports 11 (Fig. 4). The upper run of the belt within the oven is also supported by suitable frames 12 (Fig. 4) which also may carry rollers or equivalent supporting devices over which the belt moves. For the upper run of the belt the ends 4 of the oven are provided with openings 13. With the belt running continuously the cookies 14 in dough form are delivered from any cookie producing machine, the delivery end of which is indicated at 15, to the upper run of the belt, and are carried through the oven, baked therein, pass from the oven and are delivered from the belt at the opposite end of the upper run of the belt, as indicated in Fig. 2.

Above the oven is an air housing and conduit 16 into which air is forced by a fan or blower, the housing of which is shown at 17, the blower being driven by an electric motor 18. The housing at 16 has two branches 19 and 20, the first of which extends downwardly through the top 2 of the oven between its sides and communicates with an elongated flue 21. As shown in Fig. 4, the flue preferably is of rectangular outline and occupies a central portion at the upper side of the oven. In the lower side 22 of the flue a plurality of spaced outlets 23 are made through which air passes into chambers provided by diverging downwardly and outwardly extending sides 24 to the lower ends of which a perforated plate 25 of the form shown is permanently connected. There are vertical partitions 24a crosswise of the elongated chamber provided by the sides 24 and 25, dividing the length into chambers, each of which has an entrance for air at its upper side at 23. The plate 25 is preferably of sheet metal with openings therethrough over substantially its entire area so that the air entering any chamber passes downwardly through said openings directly over the cookies 14 carried on the upper run 8 of the endless belt previously described.

A plate 26 also perforated in the same way as the plate 25 is connected at its lower edge, as shown in Fig. 4, to a projecting edge portion of the plate 25 and extends upwardly and outwardly to the top of the oven. A second plate 27 is connected at the opposite edge portion of the plate 25 and extends upwardly and outwardly. A return flue 28 for the heated air from the oven has branch flues 29 joining therewith which at their inner ends are in conjunction with the space between the plate 27 and the adjacent sides of the flue 21. Therefore, the air which passes downwardly through the plates 25 comes against the cookies 14 and circulates upwardly and through the plates 26 and 27 and is carried through the branches at 29 to the vertical return flue 28. The return air passes to a casing 30 where it receives heat and thence to the blower at 17, as will be later described.

The other branch 20 from the housing at 16 extends vertically downward alongside a side 8 of the oven and is then turned inwardly joining with a second elongated flue 31 at the lower side of the oven, and centrally positioned with respect thereto immediately below the flue 22. In the top 32 of this flue are several outlets 33 for air, which extend upwardly so that the air is delivered into chambers provided by the outwardly and upwardly diverging sides 34, vertical partitions 34a and a cover plate 35 similar in all respects to the plate 25, except that it is inverted in position. A perforated plate 36 connected at its upper edge to one side edge portion of the plate 35 extends downwardly and slightly outward to the branch 20 and bottom of the oven, and a second perforated plate 37 is connected at its upper edge to the opposite longitudinal edge portion of the plate 35 and extends downwardly and outwardly in the same way, there being conduits at 38 connecting the space within the plates 34, 36 and 37, to the lower end of the return flue 28. The heated air, passing upwardly through the outlets 33 into the several chambers under the perforated plate 35, circulates upwardly through the openings in the plate 35 and against the underside of the belt and is returned through the openings in the plates 36 and 37 to the flues 38 to the return flue 28 and thence to the casing 30.

Regulating dampers 39 are provided, one for each of the air outlets 23 and 33. They are slidably mounted against the bottom 22 and the top 32 of the respective upper and lower flues 21 and 31 and may be moved to control the effective area of air passage through the outlets 23 and 33. A rod 40 threaded at its inner end, screws through a threaded lug on each of the dampers 39 and extends outwardly to a side of the oven, being equipped with hand wheels 41 for manual operation.

The air which is returned through the flue 38 to the casing 30 goes therefrom through a conduit 42 to the inlet side of the blower 17. The belt 8 is continuously driven by an electric motor 43, Fig. 1, with a suitable speed reducer between the motor and the shaft driven thereby. In the return casing 30 air may be heated in any suitable manner by a heater indicated in dotted lines at 44 in Fig. 1. Such heater may be an electric heater, a steam coil or any other suitable heating device. Where the branch 19 carries heated air into the conduit 21, deflectors such as indicated at 19a in Fig. 3, may be used to deflect the air in both directions into the flue 21 and the same structure may be used if needed with respect to the flue 31.

With this construction, heated air is forced into the oven, passes into the conduits 21 and 31 and passes therefrom in regulated amounts through the outlets 23 and 33 into the several chambers connected with the ends of said outlets, the air then being directed downwardly and upwardly against the upper and lower sides of the upper run of the belt 8 and then passing from the oven to the heater casing 30 and again back to the blower for recirculation through the oven. By the regulation of the air throughout the entire length of the oven the correct and right amount of heated air may be directed against the cookies being baked at any portion of their travel through the oven, to thereby obtain a proper and uniform baking.

It will be noted that the perforated plates 25 and 35 approach nearest the upper run of the belt 8 at their longitudinal center lines and are inclined to the horizontal outwardly and away from said belt. The heated air which passes through the plates is thus regulated over the upper and lower surface of such upper run of the belt, and the spaces for the escape of air from between the belt and the perforated plates 25 and 35 is progressively increased outwardly so that the cookies at the outer edge of the belt are not overly baked as there is danger of occurring if said perforated plates parallel the belt. This is a feature of utility and practical importance in the construction and operation of the machine.

The construction described is very practical and useful and gets a high quantity production of baked goods. This oven is in service and has proven exceptionally satisfactory.

The invention is defined in the appended claims and is to be considered comprehensive of all forms of structure coming within their scope.

I claim:

1. In an oven provided with an elongated horizontally located enclosure, an endless belt having the upper run thereof extending through said enclosure, and means to move the belt through said enclosure, means for directing heated air against both the upper and lower sides of the belt comprising, elongated heated air receiving housings, one above and the other below the belt and spaced therefrom, the sides of said housings adjacent the belt approaching nearest to the belt substantially at the longitudinal center line thereof and diverging away therefrom outwardly in both directions, as specified.

2. In an oven provided with a horizontally elongated heat insulated enclosure, an endless belt passing longitudinally through said horizontal enclosure, and means for moving the belt, the combination of elongated horizontal housings, one above and the other below the belt within said enclosure, means for forcing heated air into said housings, the sides of said housings adjacent the belt being perforated for air escape, and partitions spaced from each other in said housings dividing the housings into consecutive compartments, as and for the purposes specified.

3. A construction containing the elements in combination defined in claim 2, said housings being provided with air inlets to the compartments thereof, and manually operable means for regulating the area of air passage through said inlets, said means being operable from outside of said enclosure.

4. In an oven provided with a horizontally elongated enclosure substantially rectangular in cross section, rollers mounted to turn about horizontal axes, one at each end of said enclosure, an endless belt passing around said rollers and extending lengthwise of the enclosure, and means to drive one of said rollers, the combination of elongated housings located within the enclosure, one above and the other below the belt within said enclosure and spaced therefrom, each of said housings having diverging sides extending away from each other from their edges farthest away from the belt to their edges nearest the belt, perforated plates closing the sides of said housings nearest the belt, combined with means for forcing heated air into said housings to pass through said perforated plates and be directed toward both the upper and lower sides of said belt.

5. A construction containing the elements in combination defined in claim 4, said perforated sides of said housings each consisting of two elongated sections extending the full length of the housing, said sections being located at an obtuse angle to each other with the apexes of said angles approaching nearest to the belt.

6. A construction containing the elements in combination defined in claim 4, said perforated plates each being formed of two elongated sections extending in the full length of the housing and located at an obtuse angle to each other, said sections extending outwardly and at an angle to the horizontal from the apexes of said angles, vertical partitions dividing the housings into spaced apart consecutive chambers, and inlets for the heated air to said chambers.

7. In an oven provided with a horizontally located, elongated, heated insulated enclosure, and an endless belt movable lengthwise through the enclosure, the combination of horizontal flues within the enclosure, one against the bottom and the other against the top thereof extending substantially the full length of said enclosure, an elongated housing below the upper flue and a second elongated housing above the lower flue above and below the belt where it passes through said enclosure, said housings extending substantially the full length of said flues and having their sides thereof nearest the belt perforated, inlets between said flues and the adjacent housings, and means for forcing air into said flues and therefrom into the housings to pass through the perforated sides thereof.

8. A construction containing the elements in combination defined in claim 7, combined with dampers associated one with each of said inlets, and means for manually operating said dampers across said inlets to regulate the effective air passing area therethrough, as specified.

9. A construction containing the elements in combination defined in claim 7, combined with means for forcing heated air into said flues including, an air blower and a casing therefor, means for carrying the heated air after it has passed from said housings out of said enclosure, a casing to which said heated air is carried and in which it is adapted to receive heat, and connections between said casing and the blower casing for conveying said air to the blower.

10. In an oven provided with a horizontally located, heat insulated enclosure, an elongated horizontal carrier for articles to be baked extending through said enclosure, and means for moving said carrier lengthwise of the enclosure, the combination of elongated housings located one above and the other below and in parallel relation to said carrier and having sides next adjacent the carrier perforated for flow of air, means for forcing heated air into said housings, said sides of the housings next to the carrier being of angular form and approaching the carrier closest substantially at their longitudinal center lines and extending therefrom outwardly and away from said carrier, substantially as and for the purposes described.

11. The combination with an elongated oven, a conveyor extending through said oven and means to drive the conveyor, of air heating and circulating means having an inlet and an outlet, an elongated conduit approximately the length of said oven having one side adjacent to and parallel with said conveyor, said side being perforated and partitions in said conduit dividing it into a plurality of chambers all communicating with the outlet of said heated air circulating means.

12. The elements in combination defined in claim 11, combined with a second conduit parallel with and substantially the same length as said first conduit and having openings distributed throughout its length communicating with said oven and means for communicating said second conduit with the inlet of said air heating and circulating means.

13. The combination with an elongated oven, a conveyor extending therethrough and means for moving said conveyor, of a combination hot air supply and return air conduit comprising a structure having outer sides, one of which is adjacent and parallel with said conveyor and two longitudinal inner partitions dividing said conduit into three longitudinal passages, an outer wall of each of said passages having perforations distributed throughout its length, air heating and circulating means having an inlet and an outlet, means for communicating the middle of said longitudinal passages with the outlet of said heating and circulating means, means for communicating both of the outer of said passages with the inlet of said air heating and circulating means.

14. The elements in combination defined in claim 13 combined with partitions in said middle passage dividing it into a plurality of chambers all of which communicate with said hot air supply means.

FRANK CHARLES WERNER.